(No Model.)
E. FERNHOLTZ.
MOLD FOR BRICK MACHINES.
No. 518,185. Patented Apr. 10, 1894.
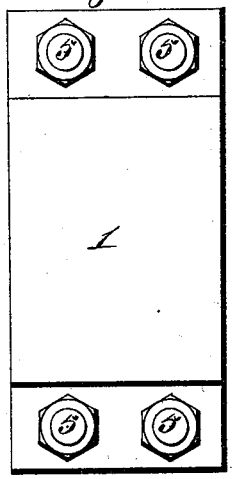
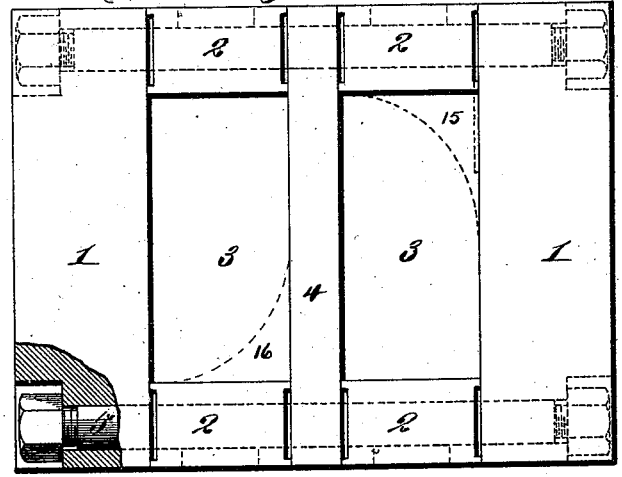
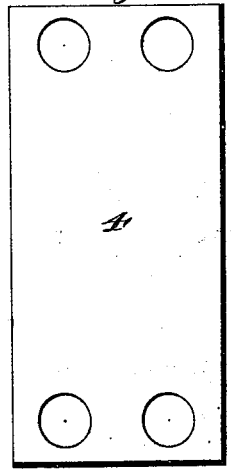
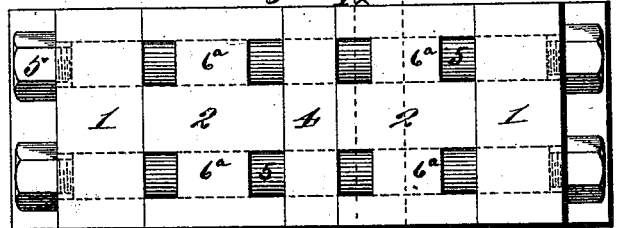
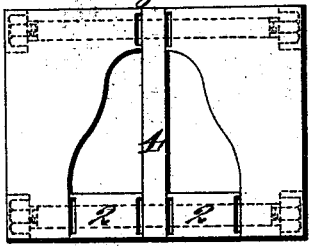
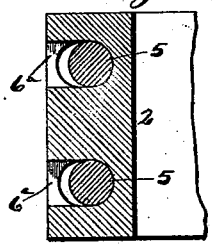
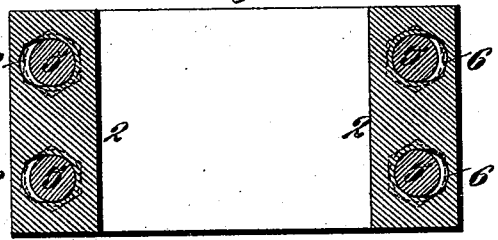
Attest:
John Enders Jr.
A. M. Ebersole
Inventor
Emil Fernholtz
by Knight Bros.
Att'ys.
THE NATIONAL LITHOGRAPHING COMPANY,
WASHINGTON, D. C.

UNITED STATES PATENT OFFICE.

EMIL FERNHOLTZ, OF ST. LOUIS, MISSOURI, ASSIGNOR OF ONE-HALF TO JACOB STOCKE AND HENRY C. BECKMANN, OF SAME PLACE.

MOLD FOR BRICK-MACHINES.

SPECIFICATION forming part of Letters Patent No. 518,185, dated April 10, 1894.

Application filed September 27, 1893. Serial No. 486,608. (No model.)

*To all whom it may concern:*

Be it known that I, EMIL FERNHOLTZ, of the city of St. Louis, in the State of Missouri, have invented a certain new and useful Improvement in Molds for Brick-Machines, of which the following is a full, clear, and exact description, reference being had to the accompanying drawings, forming part of this specification.

My invention relates to a sectional or knock-down mold for brick machines, which can be adjusted as the parts become worn, to keep the bricks always the same size, and which is strong and durable.

My invention consists in features of novelty hereinafter fully described and pointed out in the claims.

Figure I is a top or plan view of my improved mold. Fig. II is an end view. Fig. III is a side view. Fig. IV is a side view of one of the ends of the mold removed. Fig. V is an edge view of same. Fig. VI is a vertical, transverse section, on line VI—VI, Fig. III, and showing a single mold, made in accordance with my invention; Figs. I and III showing double molds. Fig. VII is a view of the partition of a double mold, such as is shown in Figs. I and III. Fig. VIII is a top view illustrating the use of the mold as made for the manufacture of bricks other than the ordinary square shape. Fig. IX is a section taken on line IX—IX, Fig. III.

Referring to the drawings, 1 represents the sides of the mold, 2 are the ends of the mold. The mold may be made with a single chamber, or it may be made with more than one chamber, as shown in Fig. I, where it is represented as having two chambers 3. When made with more than one chamber, the different chambers are divided or separated by a partition 4. The sides, ends and partition are preferably all made of separate pieces connected by bolts 5 passing through the ends of the side pieces, and passing through the end pieces, and through the partitions. The end pieces have slots or channels 6, (see Fig. V,) through which the bolts 5 pass, so that as the parts become worn, the end pieces may be adjusted inwardly by loosening on the nuts of the bolts 5, and then by tightening the nuts again, the end pieces will be held to their adjustment. For the purpose of strengthening the ends at the channels 6, without interfering with the ready insertion of a filling of suitable material, such as sulphur, around the bolts when the ends have been adjusted, I cast the ends with webs 6ª extending across the channels, as shown in Figs. III and IX.

While I prefer to make the ends, sides and partition all independent of each other, yet in some instances one end might be formed integral with one of the sides, or integral with the partition.

In Fig. VIII I have shown the adaptability of my improved mold to the pressing of bricks of different shapes, the parts being formed of the shape that it is desired to form the bricks.

The dotted lines 15, Fig. I, show a projection on one of the ends 2, and the dotted lines 16 show a projection on the partition 4, which may be used for forming irregular bricks.

I claim as my invention—

1. In a mold for brick machines, the combination of the sides and ends formed of separate pieces, fitting and bearing squarely against each other; the said end pieces having a fixed contact and full bearing with the side pieces and formed with the channel 6, and bolts passing through the ends of the sides and through the end pieces, whereby the ends may be set up as they become worn, substantially as and for the purpose set forth.

2. In a mold for brick machines, the combination of the sides 1, perforated near their ends, ends 2 having channels 6, crossed by webs 6ª, a partition 4 perforated at its ends, and connecting bolts 5 passing through the perforations in the sides and partition, and through the channels in the ends; substantially as and for the purpose set forth.

EMIL FERNHOLTZ.

In presence of—
CHARLES EHRMANN,
HENRY ALT.